United States Patent Office 3,430,633
Patented Mar. 4, 1969

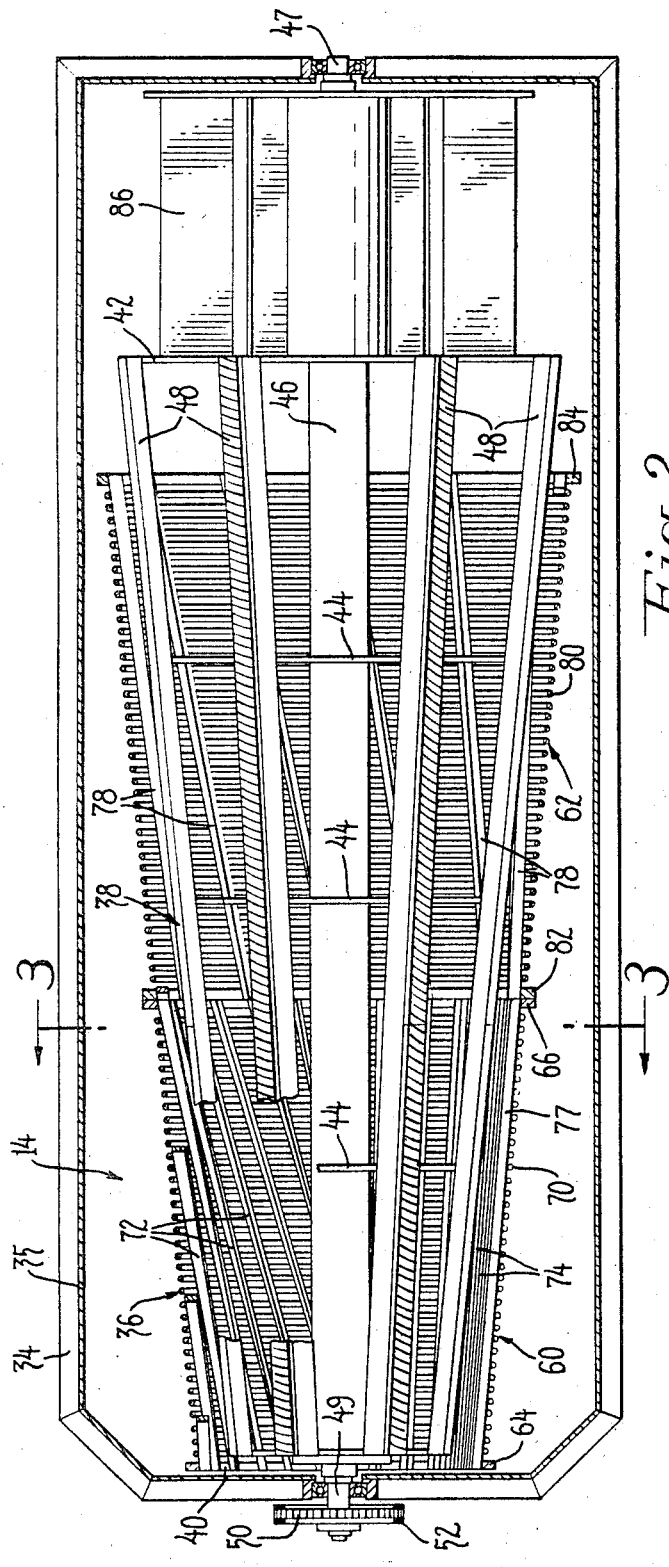
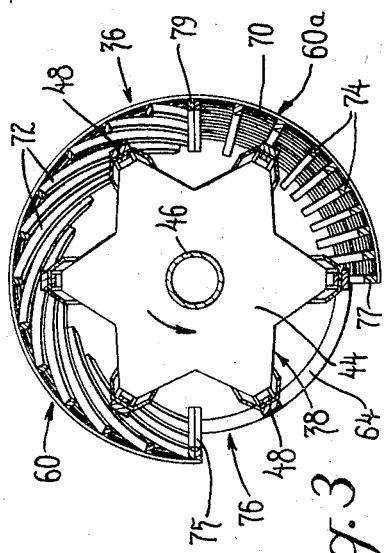
Fig. 2
Fig. 3
INVENTOR.
ALEXANDER H. MARK

3,430,633
CONICAL THRESHING ASSEMBLY
Alexander H. Mark, Livonia, Mich., assignor to Massey-Ferguson Inc., Detroit, Mich.
Filed Oct. 18, 1965, Ser. No. 497,002
U.S. Cl. 130—27      5 Claims
Int. Cl. A01f 7/06; A01d 41/12

ABSTRACT OF THE DISCLOSURE

A threshing assembly including a conical concave enclosing a cylinder having axially extending peripheral bars. Spiral guide bars are mounted on the inner surface of the concave to cooperate with the cylinder bars and cause the material to advance axially to the larger discharge end of the threshing unit during the threshing operation.

---

This invention relates generally to agricultural grain separating apparatus and is particularly concerned with a threshing unit having a conical cylinder and concave.

In conventional combine harvesters, the threshing mechanism includes a cylinder and concave which cooperate to partially separate the grain from the straw and chaff and feed the partially separated mixture of straw and grain from the concave onto straw walkers for final separating. As the material is agitated either on the concave or straw walkers, the grain is separated by gravity from the harvested mass of material.

In accordance with the present invention, a conical, transverse cylinder having axially extending peripheral bars is enclosed coaxially within a conical concave. The cylinder rotates within the concave, and the cylinder bars cooperate with the inner surface of the concave to agitate the harvested crop material fed therein and centrifugally separate the grain from the straw through openings in the concave. The material is fed into the concave radially, or from the side adjacent its smaller end, and helical or spiral flights or guide bars on the inner surface of the concave cooperate with the cylinder bars to cause the material to advance axially toward the larger discharge end of the threshing unit. As the diameter of the threshing unit increases from the small end, the peripheral speed and hence the centrifugal force acting on the grain increases to separate the tougher kernels from the straw which is discharged radially from the large end of the threshing. The high speed, powered separation eliminates the necessity for straw walkers, and the centrifugal force generated by the cylinder provides more efficient and complete separation of the grain from the straw. The helical guide bars on the inner surface of the conical concave increases the rate at which material can be fed into the threshing unit by positively propelling the material along the axis of the unit toward the discharge end.

Preferably, a plurality of straight flights are provided on a segmental portion of the inner surface of the concave to be encountered by the crop material immediately upon its entry into the concave. The straight flights extend axially along the concave in the quadrant immediately below the feed opening and the cylinder rotates in a direction such that the crop material initially encounters the straight flights. The helical flights are mounted on the remaining surface of the concave so that the straw is deflected axially toward the large, discharge end of the concave as soon as it passes the straight flights. Consequently, the major portion of the grain is separated at the straight flights and the tougher kernels are separated as the material advances toward the larger end of the concave to increase the centrifugal force.

The objects, advantages and features of the invention will become apparent from the following description taken in connection with the accompanying drawings in which:

FIG. 2 is an enlarged, longitudinal sectional view through the threshing unit; and FIG. 3 is a transverse sectional view of the threshing unit taken substantially along line 3—3 of FIG. 2.

Figure 1:
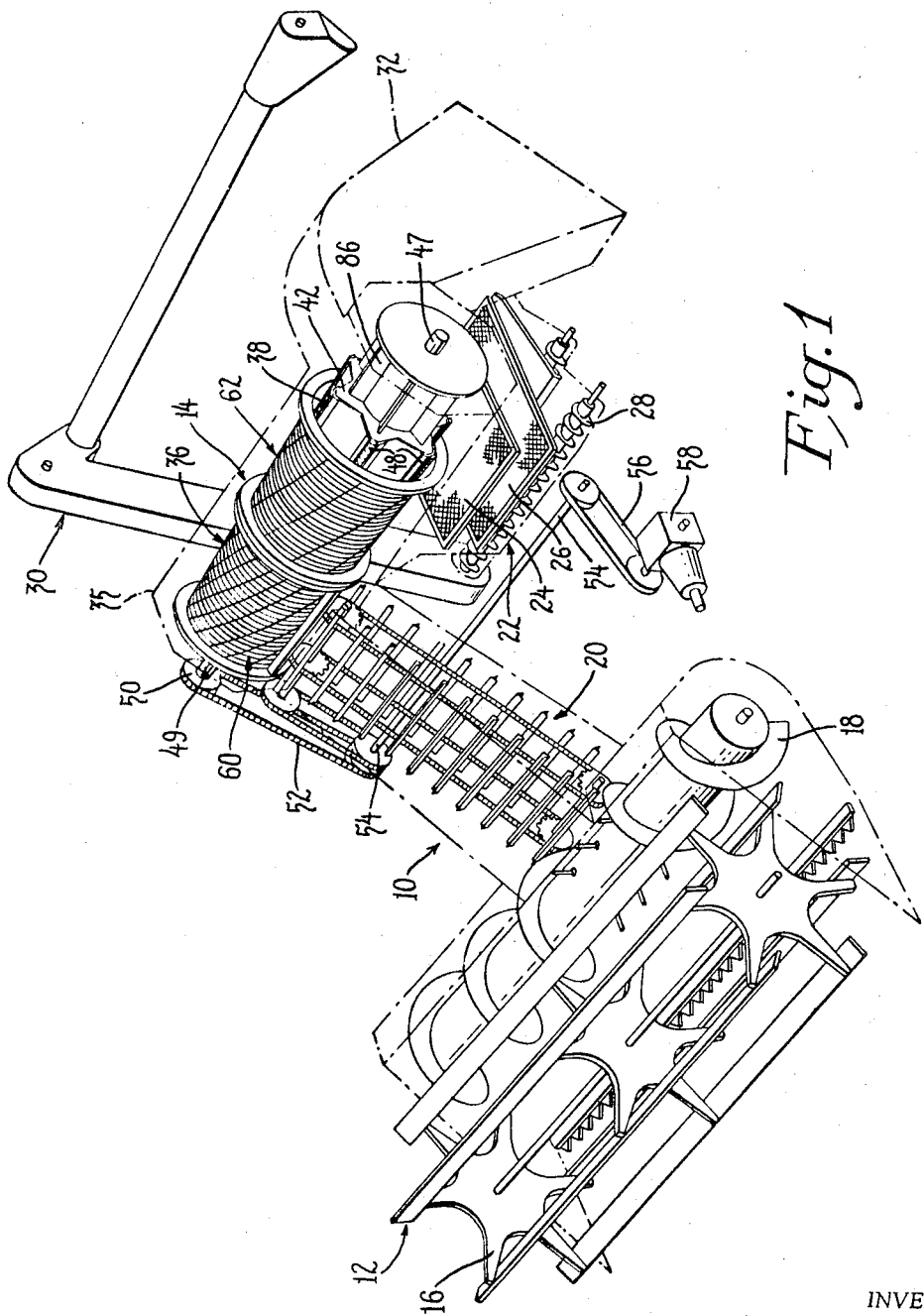
FIG. 1 is a partial perspective view of a combine having a threshing assembly embodying the invention.

With reference to FIG. 1, reference numeral 10 designates collectively a portion of a combine having a header assembly 12 and a threshing and separating assembly 14. The header assembly includes a reel 16 for guiding standing crop material over a cutter bar (not shown) which is fed by an auger 18 into an elevator 20. Elevator 20 feeds the harvested crop material into the threshing and separating assembly 14.

The grain is separated from the straw by the threshing and separating assembly 14 and is directed onto a cleaning assembly 22 including shaker shoes 24 and 26. A stream of air is directed over the shaker shoes to blow chaff and foreign material out with the straw through a discharge chute 32. The grain is collected beneath the shaker shoes and delivered by an auger 28 to a grain elevator and discharge spout assembly 30 which in turn delivers the grain into a storage area.

With reference to FIG. 2, the threshing unit 14 is supported within a housing 35, illustrated in phantom in FIG. 1, on a frame 34 and includes a concave 36 and threshing cylinder 38. Cylinder 38 includes axially spaced end plates 40 and 42 and intermediate stiffener plates 44 through which extends a shaft 46. Supported on the periphery of plates 40, 42 and 44 is a plurality of axially extending bars 48 which preferably are serrated on their outer surface for purpose to be set forth below. Shaft 46 is secured to stub shafts 47 and 49 journalled in frame 34, and cylinder 38 is caused to rotate about the axis of shaft 46 by a drive pulley or sprocket 50 mounted on shaft 49. The pulley or sprocket 50 is driven by a belt or chain 52 from a shaft 54 (FIG. 1). Shaft 54 in turn is driven by a belt 56 from a transmission or drive unit 58 (FIG. 1). Cylinder 38 is a conical configuration having its small end toward the left in FIGS. 1 and 2 and its large end toward the right, that is, the diameter of the cylinder increases progressively from plate 40 to plate 42.

Cylinder 38 is axially enclosed by the conical concave 36 which, in the illustrated embodiment, is made up of two axial sections, the section forming the smaller end of the conical concave being designated by reference numeral 60, and the section forming the larger end of the conical concave being designated by reference numeral 62. Section 60 is made up of axially spaced, annular end frame members 64 and 66 between which a screen 70 is supported. In the illustrated embodiment, screen 70 comprises helically wound wire, the space between adjacent coils permitting the grain to pass through the screen. Obviously, any screen or wire mesh of open grid work construction would be suitable for this purpose. Extending along the inner surface of screen 70 along the length of section 60 is a plurality of helical or spiral guide bars or flights 72. A side inlet opening 76 is formed in section 60 adjacent its small end and a plurality of straight flights 74 extend axially along the inner surface of screen 70 adjacent opening 76.

Opening 76 extends over substantially the entire lower left quadrant of the conical concave section 60 as shown in FIG. 2 with its upper and lower edges defined by axial bars 75 and 77, respectively. The straight flights are spaced along the inner surface of a segmental portion 60a defined between bar 77 and a straight bar 79. As illustrated, portion 60a comprises the quadrant immediately beneath or following the lower edge 77 of opening 76. Hence, with cylinder 38 rotating in a counterclockwise direction (FIG. 3), bars 48 cause the crop material to initially encounter the straight flights 74 as it enters the concave through opening 76.

The helical flights 72 are mounted on the remaining portion of the inner surface of section 60, which portion is defined between bars 75 and 79 in FIG. 3, that is, the upper half of the concave section 60. Thus, as the crop material is carried around the concave section 60 by cylinder 38 in a counterclockwise direction, bars 74 cooperate with the cylinder to separate the major portion of the grain. As the crop material moves past segment 60a, it encounters the helical flights 72 and is deflected axially along the concave toward section 62.

Section 62 of the concave is formed with axially spaced, annular end frames 82 and 84 between which is supported a screen 80 similar to screen 70. Helical or spiral flights 78 are mounted on the inner surface of screen 80 along its length.

As the harvested crop material is fed into inlet opening 76 by elevator 20, with bars 48 rotating in the direction of the arrow of FIG. 3, the material is carried around the inner surface of concave section 60 where it first encounters the straight bars 74 and then the helical bars 72. As the material is carried arround the concave, the separated grain passes through screen 70 and is directed onto the shaker shoes 24 and 26. The harvested crop material is deflected by bars 72 in an axial direction toward section 62 of the concave, and this movement is assisted by the angle of the serrations in the outer surface of bars 48. As the material advances toward the right, the diameter of the concave increases and hence the peripheral speed of the material increases such that the centrifugal force acting on the material increases to separate the tougher kernels from the stems. When the material reaches the right end of section 62 as viewed in FIG. 2, the straw is discharged into chute 32 by a blower 86 mounted on the right end of shaft 46 of the cylinder.

The entire separating step takes place within the cylinder and concave thus eliminating the straw walkers. The separation takes place due to centrifugal force as opposed to the usual gravity separation permitting high speed operation of the threshing unit. The high speed, centrifugal separation permits riper kernels to be separated from the crop material and the separating force increases as the material progresses toward the large end of the conical concave due to the action of the helical flights 72 and 78. Since the material is fed and discharged radially or transversely with respect to the threshing unit, the length of the combine is reduced substantially and the threshing unit may be disposed transversely to the direction of travel of the combine. The opposed surfaces of the concave and cylinder may be either parallel or converging, and can be adjusted as disclosed in the copending application of A. H. Mark and Joseph Necas, Ser. No. 365,062, filed May 5, 1964 now Patent Number 3,306,302. The converging surfaces automatically allows for thinning of the material as the speed increases toward the discharge end of the threshing unit.

While a specific embodiment of the invention has been illustrated and described, it will be apparent to those skilled in the art that various equivalents and alternatives in the construction and arrangement of parts is possible without departing from the scope and spirit of the appended claims.

I claim:
1. A threshing assembly including a rotatable, conical cylinder having a plurality of spaced bars extending axially along its periphery; and a stationary, conical concave having openings throughout its surface for the passage of grain and coaxially surrounding the cylinder and cooperating with the cylinder to separate grain from the stalks of crop material during rotation of the cylinder, characterized by said conical concave having means cooperable with the axial bars of said conical cylinder for propelling and guiding crop material fed into the assembly adjacent the smaller ends of the concave and cylinder toward the larger ends thereof during rotation of the cylinder to progressively increase the centrifugal force on the crop material as it advances toward the larger ends of the concave and cylinder, said means comprising a plurality of spiral flights on the inner surface of the conical concave operable to deflect crop material centrifugally thrown against the inner surface of the concave axially toward the larger end of the conical concave, an opening in the conical concave adjacent its smaller end through which crop material may be fed into the concave transversely to the common axis of the concave and cylinder, and a plurality of peripherally spaced, axially extending straight flights on the inner surface of the concave adjacent said opening, said straight flights being mounted on a segmental portion only of the inner surface of the concave and having a length less than the length of said concave, said spiral flights being mounted on the remaining portion of the inner surface of the concave.

2. A threshing assembly as defined in claim 1 wherein said segmental portion comprises substantially the first quadrant of the inner surface of the concave encountered by the crop material upon its entry into the concave through said opening.

3. A threshing assembly as defined in claim 2 wherein the length of said straight flights is substantially the same as the axial length of said opening, and wherein said straight flights are located on the concave inner surface immediately beneath the lower edge of said opening, and wherein the cylinder rotates in a direction such that the cylinder bars move downwardly past the opening to cause the crop material to initially encounter the straight flights upon its entry into the concave, the crop material subsequently engaging the spiral flights to be deflected axially along the concave toward the larger end thereof.

4. A threshing assembly as defined in claim 3 further including means for discharging the stalks of the crop material from the concave in a transverse direction with respect to the axis of the concave and cylinder.

5. A threshing assembly as defined in claim 4 wherein said cylinder bars are provided with serrations on their outer surfaces, said serrations being inclined relative to the axis of the cylinder in a direction to impart axial movement of the crop material toward the large end of the concave.

References Cited

UNITED STATES PATENTS 3,212,243  10/1965  Mark et al. _____ 56—21

ANTONIO F. GUIDA, *Primary Examiner.*

U.S. Cl. X.R.

56—21